3,288,839
o-(2-PROPYNYLOXY)BENZOATES
Chester E. Pawloski, Bay City, Mich., assignor to The Dow Chemical Company, Midland, Mich., a corporation of Delaware
No Drawing. Filed Dec. 26, 1963, Ser. No. 333,642
4 Claims. (Cl. 260—474)

The present invention is directed to a compound corresponding to the formula

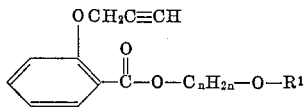

wherein $R^1$ represents —H, —$C_3H_6OH$ or —$CH_2C \equiv CH$ and $n$ represents one of the integers 2 and 3. These compounds are organic solids and liquids which are somewhat soluble in many organic solvents and of low solubility in water. The compounds have been found to be useful as pesticides for the control of various insect, mite, worm, bacterial, fungal and plant organisms such as roundworms, bettles, roaches, mites, blight, radish and pea plants.

The new compounds can be prepared by reacting a propargyl halide with a monosalicylate of the formula

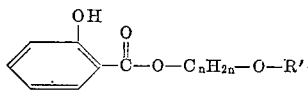

wherein R″ represents hydrogen or —$C_3H_6OH$. The reaction is carried out in the presence of a basic material and preferably in a liquid reaction medium such as isopropanol, acetone or methyl ethyl ketone. The reaction takes place smoothly at temperatures at which halide of reaction is produced and preferably at temperatures from about 0° to 100° C. The halide of reaction appears in the reaction mixture as the salt of the metal moiety of the employed base. Good results are obtained when employing one molecular proportion of the salicylate starting material and at least one, preferably an excess, of each of the propargyl halide such as the chloride or bromide and basic material. The reaction consumes one molecular proportion of each of the propargyl halide and basic material for each 2-propynyl group to be introduced into the molecule. To obtain optimum yields, the use of the reactants in amounts which represent such proportions is preferred.

In carrying out the reaction, the propargyl halide, monosalicylate and the basic material such as an alkali metal carbonate can be combined in any convenient manner. In a preferred procedure, the reactants are dispersed in an organic solvent as reaction medium. The temperature of the reactants is maintained in the reaction temperature range until there is a substantial cessation in the formation of the halide of reaction. The halide of reaction can then be removed by conventional procedures such as filtration or washing with water. The filtrate or washed organic layer can then be employed as the toxic constituent in pesticidal compositions. If a product of greater purity is desired, the filtrate or washed organic layer can be heated to remove the low boiling constituents and obtain the product as a residue. This product residue can then be employed in pesticidal compositions.

The following examples merely illustrate the invention and are not to be construed as limiting.

*Example 1.*—*Dipropylene glycol o-(2-propynyloxy) benzoate*

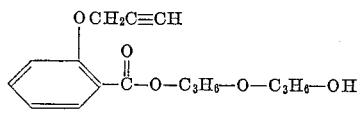

In a representative operation, dipropylene glycol monosalicylate (56 grams), propargyl bromide (30 grams) and potassium carbonate (35 grams) were dispersed in 300 milliliters of acetone. The dipropylene gylcol monosalicylate was predominantly the 2-(2-hydroxy-2- methylethoxy)-2-methylethyl ester of salicylic acid with small amounts of 2-(2-hydroxy-2-methylethoxy)-1-methylethyl ester of salicylic acid, 2-(2-hydroxy-1-methylethoxy)-2-methylethyl ester of salicylic acid and 2-(2-hydroxy-1-methylethoxy)-1-methylethyl ester of salicylic acid. The resulting mixture was heated at the boiling temperature under reflux for 32 hours. The reaction mixture was allowed to cool and the cooled mixture diluted with water. The organic layer which appeared during the dilution period was separated by decantation and heated to remove the low boiling constituents. The dipropylene glycol mono - o - (2-propynyloxy)benzoate product remained as a liquid residue having a refractive index $n$/D of 1.5263 at 27° C.

*Example 2.*—*2-Hydroxyethyl o-(2-propynyloxy)benzoate and 2-(2-propynyloxy)ethyl o-(2-propynyloxy)benzoate*

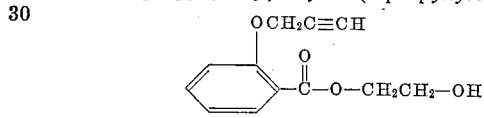

and

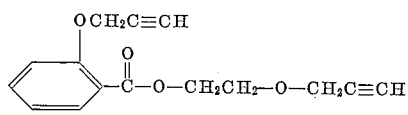

2-hydroxyethyl salicylate (50 grams), propargyl bromide (40 grams) and potassium carbonate (45 grams) were dispersed in 300 milliliters of acetone. The resulting mixture was heated with stirring at the boiling temperature and under reflux for thirty-two hours. The reaction mixture was then diluted with water and the organic layer which separated during the dilution procedure was collected and heated on the steam bath to remove the low boiling constituents. The liquid residue which remained after the heating was allowed to stand overnight. Upon standing, the 2-(2-propynyloxyethyl o-(2-propynyloxy) benzoate product solidified in the reaction as a crystalline solid. This product was separated by decantation, dried and found to melt at 101°–104° C. The liquid residue obtained during the decantation was the 2-hydroxyethyl o-(2-propynyloxy)-benzoate product having a refractive index $n$/D of 1.5272 at 25° C.

In a similar manner, the following products of the present invention are prepared as follows:

2 - hydroxy-2-methylethyl 2-(2-propynyloxy)benzoate (molecular weight of 234.2) by reacting together potassium carbonate, propargyl chloride and 2 - hydroxy-2-methylethyl salicylate.

2-(2-propynyloxy)-2-methylethyl 2 - (2-propynyloxy) benzoate (molecular weight of 272.2) by reacting together propargyl bromide, potassium carbonate and 2-hydroxy-2-methylethyl salicylate.

2 - hydroxy-1-methylethyl 2-(2-propynyloxy)benzoate (molecular weight of 234.2) by reacting together potassium carbonate, propargyl bromide and 2 - hydroxy-1-methylethyl salicylate.

2-(2-hydroxy-2-methylethoxy)ethyl 2-(2-propynyloxy) benzoate (molecular weight of 278.2) by reacting together propargyl chloride, sodium carbonate and 2-(2-hydroxy -2-methylethoxy)ethyl salicylate.

2-(2-hydroxy-1-methylethoxy)ethyl 2-(2-propynyloxy) benzoate (molecular weight of 278.2) by reacting together propargyl chloride, sodium carbonate and 2-(2-hydroxy-1-methylethoxy)ethyl salicylate.

3-(3-hydroxypropoxy)propyl 2 - (2-propynyloxy)-benzoate (molecular weight of 293.2) by reacting together propargyl chloride, sodium carbonate and 3-(3-hydroxypropoxy)propyl salicylate.

2-(3-hydroxypropoxy)ethyl 2-(2-propynyloxy)benzoate (molecular weight of 278.2) by reacting together propargyl bromide, potassium carbonate and 2-(3-hydroxypropoxy)ethyl salicylate.

2-(3-hydroxypropoxy)-2-methylethyl 2 - (2-propynyloxy)benzoate (molecular weight of 293.3) by reacting together propargyl chloride, potassium carbonate and 2-(3-hydroxypropoxy)-2-methylethyl salicylate.

2-(3-hydroxypropoxy)-1-methylethyl 2 - (2-propynyloxy)benzoate (molecular weight of 293.2) by reacting together propargyl chloride, potassium carbonate and 2-(3-hydroxypropoxy)-1-methylethyl salicylate.

The novel products of the present invention are useful as pesticides for the control of the growth and killing of a number of insect, mite, worm, bacterial, fungal and plant organisms. For such uses, the products are dispersed on a finely divided solid such as chalk, talc or bentonite and employed as a dust. Such mixtures can also be dispersed in water with or without the aid of a surface active agent, and the resulting aqueous suspension employed as sprays. In other procedures, the products are employed as active constituents in solvent solutions such as oil-in-water or wate-in-oil emulsions, or aqueous dispersions which can be used as a spray, drench or wash. In representative operations, dipropylene glycol mono-o-(2-propynyloxy)benzoate gives excellent controls and kills of pea plants when dispersed in soil at dosages of 50 pounds per acre.

The monosalicylate starting materials employed in accordance with the present invention are prepared by known methods wherein salicylic acid is esterified with a suitable alkylene glycol or dialkylene glycol. The alkylene and dialkylene glycols of the ethylene and propylene series are produced in known methods wherein propylene oxide is reacted with trimethylene glycol, propylene glycol or ethylene glycol either in the presence of a base or an acid such as sodium hydroxide or sulfuric acid. Upon completion of the reaction, the desired glycol can be separated by fractional distillation under reduced pressure.

1. Compounds corresponding to the formula

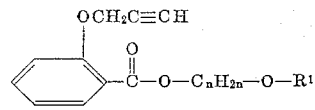

wherein $R^1$ represents a member of the group consisting of —H, —$C_3H_6OH$ and —$H_2C\equiv CH$ and $n$ represents one of the integers 2 and 3.

2. Dipropylene glycol o-(2-propynlyoxy)benzoate.
3. 2-hydroxyethyl o-(2-propynyloxy)benzoate.
4. 2-(2-propynyloxy)ethyl o-(2-propynyloxy)benzoate.

References Cited by the Examiner

UNITED STATES PATENTS 3,097,230   7/1963   Miller _____ 260—473

LORRAINE A. WEINBERGER, *Primary Examiner.*

S. B. WILLIAMS, *Assistant Examiner.*